United States Patent [19]
Cheng

[11] Patent Number: 4,705,350
[45] Date of Patent: Nov. 10, 1987

[54] OPTICAL TRANSMISSION NETWORK

[75] Inventor: Steven S. Cheng, Bernards Township, Somerset County, N.J.

[73] Assignee: Bell Communications Research, Inc., Livingston, N.J.

[21] Appl. No.: 777,952

[22] Filed: Sep. 19, 1985

[51] Int. Cl.$^4$ ............................ G02B 6/36; H04B 9/00
[52] U.S. Cl. .............................. 350/96.16; 350/96.15; 455/612
[58] Field of Search ............... 350/96.15, 96.16; 370/3; 455/606, 607, 612

[56] References Cited

U.S. PATENT DOCUMENTS

| | | | |
|---|---|---|---|
| 2,345,445 | 3/1944 | Atwood | 250/7 |
| 3,532,890 | 10/1970 | Denton | 250/199 |
| 3,584,220 | 6/1971 | Nomura et al. | 250/199 |
| 3,995,155 | 11/1976 | Hutcheson et al. | 250/227 |
| 4,161,651 | 7/1979 | Sano et al. | 455/612 X |
| 4,165,225 | 8/1979 | Auracher et al. | 65/4 B |
| 4,195,269 | 3/1980 | Ettenberg et al. | 332/7.51 |
| 4,317,614 | 3/1982 | Palmer | 350/96.16 |
| 4,326,298 | 4/1982 | Fromm et al. | 455/606 |
| 4,525,873 | 6/1985 | Baues | 455/600 |
| 4,527,286 | 7/1985 | Haworth | 455/612 |

FOREIGN PATENT DOCUMENTS 0105753  4/1984  European Pat. Off. ............ 455/612
53-41104  4/1978  Japan .................................. 455/612

OTHER PUBLICATIONS

"Design & Performance of WDM Transmission System at 6.3 M Bits", by Tetsuya et al., IEEE Transactions on Communications, vol. Com-31, No. 9, Sep. 1983.
Cheng et al., "Subscriber Loop Architecture", AT&T Technical Digest, Sep. 1984, No. 75, pp. 9-10.
Kishimoto, "Optical Coupler for Laser Redundancy System", Electronic Letters, Jan. 4, 1982, vol. 18, p. 140.
Gould Electronics Bulletin GD-11, Coupler Specifications—Update, Jun. 1984, Defense Electronics Division.

*Primary Examiner*—William L. Sikes
*Assistant Examiner*—Akm E. Ullah
*Attorney, Agent, or Firm*—James W. Falk

[57] ABSTRACT

An optical communications network which connects a central office with a plurality of user stations is disclosed.

In the central office, the power from a single cw laser is divided over a plurality of single mode optical fibers to transmit information from the central office to the user stations. Each user station includes a directly modulated LED for transmitting information to the central office.

12 Claims, 2 Drawing Figures

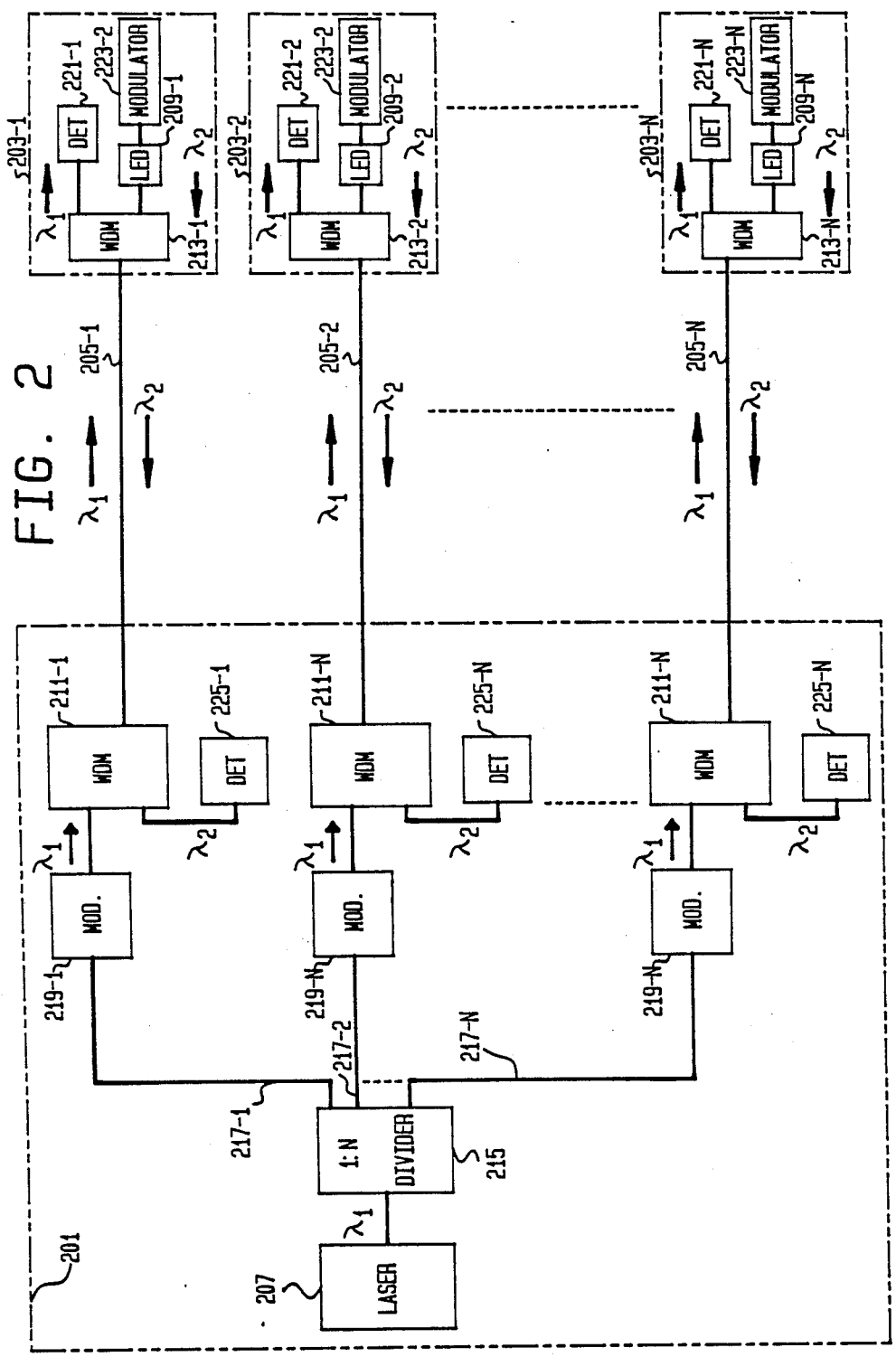

OPTICAL TRANSMISSION NETWORK

FIELD OF THE INVENTION

This invention relates to an optical transmission system, and more particularly to a short haul optical transmission system which is formed using low loss single mode optical fibers.

BACKGROUND OF THE INVENTION

In the first generation of single mode optical transmission networks, low loss single mode optical fibers were deployed in point-to-point links with directly modulated single mode lasers. A laser is directly modulated when its drive current is directly subjected to the modulated signal. For intercity transmissions where long repeater spacing and high bit rate communications are of primary concern, this is an effective and efficient use of single mode technology.

However, for short haul communications, the typical distance between a central office or other communications center and the user station is much shorter than the maximum available repeater spacing. In this environment, the use of a directly modulated laser for each communications link between a central office and an end user represents a considerable waste of laser power.

One way to more efficiently use single mode lasers and single mode optical fibers in a short haul system is to share a single laser among a plurality communications link. Laser sharing schemes for use in single short haul optical transmission systems are disclosed in U.S. patent application Ser. No. 680,398 filed on behalf of S. S. Cheng J. Lipson and S. D. Personick and U.S. patent application Ser. No. 732,556 filed on behalf of S. D. Personick. Both of these applications are assigned to the assignee hereof and are incorporated herein by reference.

In the systems described in the aforementioned patent applications, bidirectional communication is established between a central office and a plurality of user stations by means of two lasers operating at different wavelengths and located in the central office. The output of each laser is divided over a plurality of optical fibers connecting the central office with the user stations so that each fiber simultaneously transmits the two wavelengths from the central office to the user station. The first wavelength has information modulated onto it by means of external modulation while the second wavelength is transmitted unmodulated. Information which is modulated on the first wavelength is detected at the user stations while the second wavelength is externally modulated at the user stations and retransmitted to the central office.

Thus, the systems described in the above-mentioned patent applications utilize single mode technology to transmit information from the central office to the user stations and from the user stations back to the central office. While the single mode technology is necessary to transmit very wide bandwidth services such as high resolution digital video from the central office to the user stations, data transmissions from the user stations to the central office often need only lower bandwidth capability. Accordingly, simpler, non-single mode technology may be utilized to provide communications between the user stations and the central office.

It is the object of the present invention to provide a short haul communications system which enables single mode communication from a central office to a plurality of user stations while at the same time providing simpler and cheaper non-single mode technology for communications from the user stations to the central office.

SUMMARY OF THE INVENTION

The present invention is an optical transmission system for transmitting information between a central office and a plurality of user stations.

The central office comprises a single mode continuous wave laser whose output is divided by a power divider over a plurality of single mode optical fibers connecting the central office with each of the user stations. An external modulator associated with each of the single mode fibers is used to encode information on the radiation transmitted from the central office to the user stations. This information is detected by detectors located in each of the user stations.

Illustratively, each user station also includes an LED for transmitting information from the user station to the central office. Typically, the LED is directly modulated as by applying the modulating signal to its drive current. The modulated radiation from the LED is transmitted back to the central office by means of a single mode fiber or a multimode fiber.

In an alternative embodiment of the invention, bidirectional wavelength division multiplexer (WDM) devices are utilized so that only a single optical fiber is needed for each bidirectional link between the central office and a user's station.

Thus, the optical communications system of the present invention utilizes a shared laser over single mode fibers to transmit information including enhanced services such as high definition digital video from a central office to a multiplicity of user stations, while using simpler individual LEDs with a narrower bandwidth capability to transmit information from the user stations to the central office.

In comparison with networks disclosed in the aforementioned patent applications, the user stations of the present invention utilize directly modulated LEDs instead of external modulation of radiation transmitted from the central office. Similarly, the central office of the present invention has only a single laser which is divided over a set of single mode optical fibers, rather than two lasers of different wavelengths whose outputs are divided and multiplexed for simultaneous transmission to the user stations over the same set of fibers.

BRIEF DESCRIPTION OF THE DRAWING

FIG. 2 schematically illustrates an alternative optical transmission network for connecting a central office with a plurality of user stations in accordance with an illustrative embodiment of the present invention.

DETAILED DESCRIPTION

Figure 1:
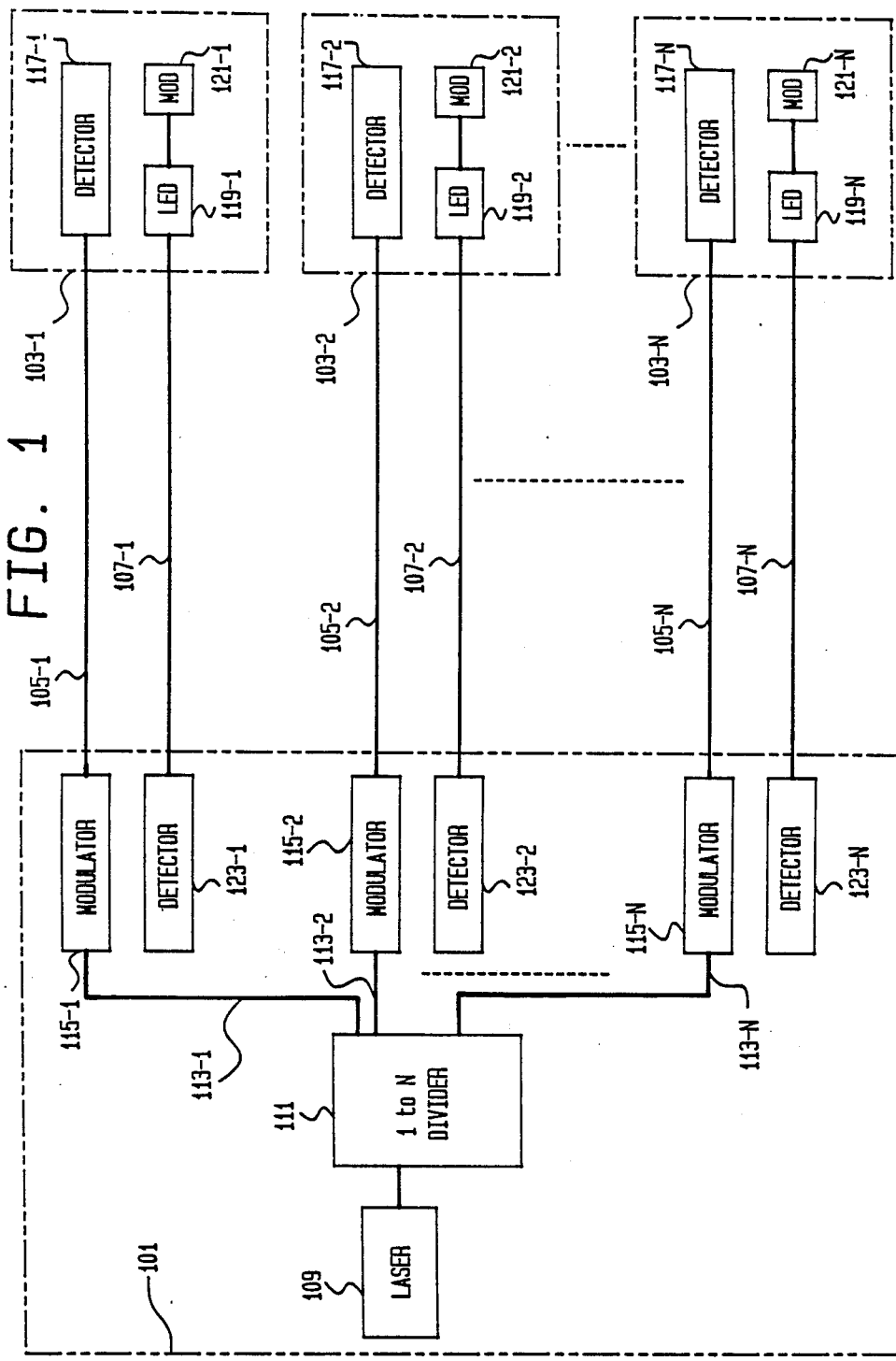
FIG. 1 schematically illustrates an optical transmission network for connecting a central office with a plurality of user stations, in accordance with an illustrative embodiment of the present invention.

The optical transmission network of FIG. 1 comprises a central office 101 and user stations 103-1,103-2, ... 103-N. Information is transmitted from the central office 101 to the user stations 103-1,103-2, ... 103-N by means of single mode low loss optical fibers 105-1,105-2 ... 105-N. Information is transmitted from the user stations 103-1,103-2, ... 103-N to the central office 101 by means of the single mode optical fibers 107-1,107-2, ... 107-N respectively. Corresponding pairs of fibers 105-1,107-1, ... 105-N,107-N form two way optical transmission links between the user stations 103-1 ... 103-N. Advantageously, N may be as large as 100.

The central office 101 comprises a single mode continuous wave laser source 109. The laser 109 produces a wavelength in the range of 1.3 $\mu$m to 1.6 $\mu$m. The laser 109 may advantageously be a wavelength stabilized GaInAsP/InP laser such as the model QLM-1300-Sm-BH manufactured by Lasertron Inc., Burlington, MA.

The coherent radiation produced by the laser 109 is divided over the single mode optical fibers 105-1,105-3 ... 105-N by means of the 1:N power divider 111. Illustratively, the power divider 111 comprises a cascaded arrangement of one-fiber-input to two-fiber-output couplers. An illustrative form of such a one-fiber-input to two-fiber-output coupler is manufactured by Gould Inc., Defense Electronics Division and is described in their bulletin GD-11. The power divider 111 has N outputs 113-1, 113-2 and 113-N, each of which receives 1/N of the total power produced by the laser 109.

Each of the outputs 113-1,113-2, ... 113-N of the power divider 111 is connected to an external modulator 115-1,115-2 ... 115-N respectively. Such external modulators are disclosed in Trans of IECE (Japan) Vol. E63, 1980 by M. Izutsu. Each of the external modulators 115-1,115-2 ... 115-N encodes information on the coherent radiation that is transmitted from the central office 101 to the user station 103-1,103-2, ... 103-N by means of the optical fibers 105-1,105-2, ... 105-N.

Each of the user stations 103-1,103-2, ... 103-N includes a detector 117-1,117-2, ... 117-N respectively. The detectors 117-1,117-2, ... 117-N detect radiation transmitted over the fibers 105-1,105-2, ... 105-N respectively and demodulate any information encoded on that radiation.

Each of the user stations 103-1,103-2, ... 103-N includes a light emitting diode (LED) 119-1,119-2, ... 119-N for transmitting information back to the central office 101 via the single mode fibers 107-1,107-2, ... 107-N. Preferably, the LEDs 119-1 ... 119-N are edge emitting devices. The outputs of the LEDs 119-1,119-2, ... 119-N are modulated with information to be transmitted to the central office by modulators 121-1,121-2, ... 121-N. In contrast to the modulators 115-1 ... 115-N in the central office 101, the modulators 121-1 ... 121-N are direct modulators. They operate by selectively turning on and off the current to the LEDs. Information transmitted from the user stations 103-1 ... 103-N by way of fibers 107-1 ... 107-N is detected in the central office 101 by means of the detectors 123-1,123-2 ... 123-N.

The use of a coherent single mode radiation source and single mode low loss optical fibers enables the central office 101 to transmit to the user stations a variety of wide bandwidth type services including high definition digital video transmissions. However, the return path which involves an LED and single mode fiber has a more limited bandwidth. However, this bandwidth is suitable for most communications between a user station and a central office. Note, that single mode optical fibers are preferred in the return path. However, multimode fibers may also be used.

Turning to FIG. 2 an alternative optical transmission network is illustrated. The optical transmission network of FIG. 2 comprises a central office 201 and user stations 203-1,203-2, ... 203-N. Information is transmitted from the central office 201 to the user stations 203-1, ... 205-N and from the user stations 203-1, ... 203-N to the central office 201 by means of the single mode low loss optical fibers 205-1,205-2, ... 205-N.

Thus each of the optical fibers 205-1,205-2 ... 205-N forms a bidirectional optical link between the central office 101 and one of the user stations 203-1,203-3, ... 203-N.

Each of the fibers 205-1, ... 205-N transmits two wavelengths of radiation simultaneously. As shown in FIG. 2, wavelength $\lambda_1$, is transmitted from central office 201 to the user stations 203-1 ... 203-N and wavelengths $\lambda_2$ is transmitted from the user stations back to the central office. Illustratively, the wavelength $\lambda_1$ and $\lambda_2$ in the range of 1.3 to 1.6 $\mu$m.

The wavelength $\lambda_1$ radiation is produced in the central office 101 by means of the single mode continuous wave laser 207. The wavelength $\lambda_2$ radiation is produced in the local offices 203-1,203-2, ... 203-N by means of LEDs 209-1,209-2, ... 209-N, which illustratively are edge emitting devices.

At each end of the optical fibers 105-1,105-2, ... 105-N there is a bidirectional wavelength division/multiplexer (WDM) device. The bidirectional WDM devices 211-1,211-2, ... 211-N are located in central office 201. Similarly WDM devices 213-1,213-2, ... 213-N are located in the user stations 203-1,203-2, ... 203-N respectively. As discussed in more detail below, the bidirectional WDM devices permit the fibers 205-1 ... 205-N to simultaneously transmit the wavelength $\lambda_1$ and wavelength $\lambda_2$ radiation in opposite directions. Such WDM devices are discussed in OFC'83 conference PO#1.

Returning now to the operation of the central office 101, the wavelength $\lambda_1$ radiation produced by the laser 207 is divided over the fibers 205-1,205-2, ... 205-N by means of the 1:N power divider 215 which as discussed above may be a cascaded arrangement of a one-fiber-input to two-fiber-output couplers. The power divider 215 has N outputs 217-1,217-2, ... 217-N each of which receives 1/N of the total wavelength $\lambda_1$ power output of the laser 207.

Each of the outputs 217-1,217-2, ... 217-N of the power divider is connected to an external modulator 219-1,219-2, ... 219-N respectively. The external modulators 219-1 ... 219-N encode information on the coherent wavelength $\lambda_1$ radiation that is transmitted from the central office 101 to the user stations 203-1 ... 203-N by means of the single mode optical fibers 205-1 ... 205-N. The modulated wavelength $\lambda_1$ radiation exiting from the modulators 219-1 ... 219-N is multiplexed with the oppositely directed wavelength $\lambda_2$ radiation transmitted over the fibers 205-1 ... 205-N by means of the bidirectional WDM devices 211-1 ... 211-N.

At the user stations 203-1,203-2, ... 203-N, the WDM devices 213-1,213-2, ... 213-N demultiplex the incoming wavelength $\lambda_1$ radiation from the outgoing wavelength $\lambda_2$ radiation. The wavelength $\lambda_1$ radiation is then detected by the detectors 221-1,221-2 ... 221-N.

In order to transmit information from the user stations 203-1,203-2, ... 203-N to the central office 201, the LEDs 209-1,209-2, ... 209-N are directly modulated by the modulators 223-1,223-2, ... 223-N. The modulated wavelength $\lambda_2$ radiation produced by the LEDs 209-1,209-2, ... 209-N is multiplexed with the oppositely directed wavelength $\lambda_1$ radiation by the WDM devices 213-1,213-2, ... 213-N. At the central office 201, wavelength $\lambda_2$ radiation transmitted on the fibers 205-1,205-2, ... 205-N is demultiplexed by the WDM devices 211-1, 211-2, . . . 211-N and is detected by the detectors 225-1, 225-2, . . . 225-N.

The use of coherent radiation along with single mode low loss optical fibers enables the central office to transmit a variety of wide band services such as high definition digital video. Because communication from the user stations to the central office involves the use of an LED which emits multimode radiation onto the single mode optical fiber, dispersion will prevent very wide band signals from being transmitted to the central office. However, the dispersion will not prevent more routine lower bandwidth signals from being transmitted from the user stations to the central office.

Thus, an optical transmission network for providing communications between a central office and a plurality of user stations is disclosed. Single mode technology is used to transmit information from the central office to the user station, while simple and cheap multimode technology is used to transmit information from the user stations to the central office.

Finally, the above described embodiments of the invention are intended to be illustrative only. Numerous alternative embodiments may be devised by those skilled in the art without departing from the spirit and scope of the following claims.

I claim:

1. An optical transmission network comprising:
   a central office,
   a plurality of user stations, and
   a plurality of bidirectional optical transmission paths for connecting said central office with each of said user stations,
   said central office comprising:
   a coherent light source for emitting coherent radiation to accommodate high-capacity, wide bandwidth data requirements,
   power dividing means for dividing said coherent radiation over said transmission paths for transmitting said coherent radiation from said central office to said user stations,
   modulating means associated with each of said transmission paths for modulating high-capacity, wide bandwidth information onto said coherent radiation transmitted from said central office to said user stations, and
   detector means associated with each transmission path for detecting radiation transmitted from said user stations to said central office; and
   each of said user stations comprising,
   a detector for detecting the information modulated onto said coherent, high-capacity, wide bandwidth radiation transmitted from said central office, and
   a light emitting diode for transmitting low-capacity, narrow bandwidth information-bearing radiation to said central office.

2. The network of claim 1 wherein each of said user stations comprises means for directly modulating one of said light emitting diodes.

3. The network of claim 1 wherein each of said bidirectional optical transmission paths includes a single mode optical fiber for transmitting said coherent radiation from said central office to one of said user stations.

4. The network of claim 1 wherein each of said bidirectional optical transmission paths comprises,
   a single mode optical fiber for transmitting said coherent radiation from said central office to one of said user stations, and
   a single mode optical fiber for transmitting radiation from one of said user stations to said central office.

5. The network of claim 1 wherein at least one of said bidirectional optical transmission paths comprises one single mode optical fiber for transmitting said coherent radiation from said central office to one of said user stations and for transmitting radiation from said one user station to said central office.

6. The network of claim 5 wherein said single mode optical fiber has a wavelength division demultiplexer/multiplex associated with each end thereof.

7. An optical transmission network for providing communication between a central office and a plurality of user stations, said network comprising,
   a source of coherent radiation, for transmitting high-capacity, wide bandwidth information-carrying radiation, located in said central office,
   bidirectional optical transmissions means including a plurality of single mode optical fibers for transmitting a portion of said coherent radiation to each of said user stations, and
   a light emitting diode located in each of said user stations for emitting low-capacity, narrow bandwidth information-bearing radiation to be transmitted by said bidirectional transmitting means to said central office.

8. The network of claim 7 wherein each of said single mode optical fibers has a modulating means associated therewith for modulating information onto the coherent radiation transmitted to each of said user stations.

9. The network of claim 7 wherein each of the light emitting diodes is directly modulated.

10. The network of claim 7 wherein said single mode optical fibers also transmit radiation from said user stations to said central office.

11. A transmission network interconnecting a communications center and a user station, the network comprising:
    a transmission path comprising single mode optical fibers linking the communications center and the user station,
    laser means, coupled to the communications center and said path, for transmitting coherent radiation to the user station,
    modulating means associated with said path for modulating high-capacity, wide bandwidth information onto said coherent radiation transmitted from said central office to said user station,
    detector means associated with said path at the communications center for detecting radiation transmitted from the user station to the communications center,
    detector means associated with said path at the user station for detecting radiation transmitted from the communications center to the user station, and
    light emitting diode means coupled to the user station and said path, for optically communicating low-capacity, narrow bandwidth information from the user station to the communications center over said path.

12. A network interconnecting a communications center with a plurality of user stations, the network comprising:
    a plurality of bi-directional, single mode optical fiber paths interconnecting the communications center with each corresponding one of the user stations,
    the communications center further comprising:

a continuous wave coherent light source for transmitting high-capacity, wide bandwidth coherent radiation, power dividing means for dividing said coherent radiation among said paths, and wave division multiplexing means for transmitting said coherent radiation from the communications center to each user station at a first preselected wavelength over the corresponding one of said paths, each user station further comprising:

a light emitting diode for transmitting low-capacity, narrow bandwidth information, and wave division multiplexing means for transmitting said low-capacity, narrow bandwidth information to the communications center at a second preselected wavelength over the corresponding same one of said paths.

* * * * *

UNITED STATES PATENT AND TRADEMARK OFFICE
CERTIFICATE OF CORRECTION

PATENT NO. : 4,705,350

DATED : November 10, 1987

INVENTOR(S) : Steven S. Cheng

It is certified that error appears in the above-identified patent and that said Letters Patent is hereby corrected as shown below:

Column 1, line 33, "S. S. Cheng J. Lipson" should read --S. S. Cheng, J. Lipson". Column 4, Line 14, "in the" should read --are both in the--.

Signed and Sealed this

Twenty-sixth Day of July, 1988

Attest:

DONALD J. QUIGG

Attesting Officer

Commissioner of Patents and Trademarks